United States Patent [19]

Ward et al.

[11] 4,214,020

[45] Jul. 22, 1980

[54] PROCESSES FOR COATING BUNDLES OF HOLLOW FIBER MEMBRANES

[75] Inventors: Robert R. Ward, Cary; Richard C. Chang, Raleigh; James C. Danos, Chapel Hill; Joseph A. Carden, Jr., Durham, all of N.C.

[73] Assignee: Monsanto Company, St. Louis, Mo.

[21] Appl. No.: 852,277

[22] Filed: Nov. 17, 1977

[51] Int. Cl.² .................. B05D 3/00; B05D 1/18; B05D 3/02
[52] U.S. Cl. .................. 427/296; 422/48; 55/16; 55/158; 210/490; 210/500 M; 427/387; 427/393.5; 427/430.1; 156/180; 156/285
[58] Field of Search ............ 55/16, 158; 23/258.5 M; 210/500 M, 490; 264/41; 427/294, 385 B, 387, 350, 430 R, 296; 156/180, 285

[56] References Cited

U.S. PATENT DOCUMENTS

| | | | |
|---|---|---|---|
| 2,730,462 | 1/1956 | Ewing | 210/490 X |
| 2,931,737 | 4/1960 | Thornton | 427/350 |
| 3,084,661 | 4/1963 | Roberts | 118/50 |
| 3,246,764 | 4/1966 | McCormack | 210/321 |
| 3,322,566 | 5/1967 | Bright | 210/490 X |
| 3,510,387 | 5/1970 | Robb | 55/16 X |
| 3,556,305 | 1/1971 | Shorr | 210/490 |
| 3,558,392 | 1/1971 | Goodenow et al. | 156/180 |
| 3,660,281 | 5/1972 | Tober | 210/23 |
| 3,661,621 | 5/1972 | Jager | 427/296 X |
| 3,808,303 | 4/1974 | Ganci et al. | 264/41 |
| 3,855,133 | 12/1974 | Roehsler | 210/490 |
| 3,874,899 | 4/1975 | Miszenti et al. | 55/523 X |
| 3,886,066 | 5/1975 | Chen et al. | 210/23 |
| 3,928,680 | 12/1975 | Gannon | 427/296 X |
| 3,969,240 | 7/1976 | Kolobow et al. | 23/258.5 X |
| 3,996,131 | 12/1976 | Conn | 210/23 H |
| 4,014,798 | 3/1977 | Rembaum | 210/500 M |
| 4,093,769 | 6/1978 | Midorikawa | 427/244 X |
| 4,119,756 | 10/1978 | Midorikawa | 427/244 X |

OTHER PUBLICATIONS

Cabasso et al, *Research & Development of NS-1 & Related Polysulfone Hollow Fibers for Reverse Osmosis Desalination of Seawater*, Gulf South Research Institute, Jul., 1975, pp. cover, 76–89, 120–144.

*Primary Examiner*—Michael R. Lusignan
*Attorney, Agent, or Firm*—Norman L. Balmer; Howard C. Stanley; James W. Williams, Jr.

[57] ABSTRACT

Processes are disclosed for coating the exteriors of a plurality of hollow fibers which are suitable for fluid separations and which are assembled in the form of a bundle. The processes involve immersing the bundle of hollow fibers in a coating liquid containing material suitable for forming the coating and a substantial amount of solvent. A pressure drop from the exteriors to the interiors of the hollow fibers is provided to result in the formation of a deposit on the exteriors of the hollow fibers. The processes of this invention enable essentially the entire exterior surfaces of the hollow fibers to be coated without undue sticking of the hollow fibers or providing undesirably thick coatings on the hollow fibers in any portion of the bundle or on a portion of any of the hollow fibers.

32 Claims, No Drawings

PROCESSES FOR COATING BUNDLES OF HOLLOW FIBER MEMBRANES

This invention pertains to processes for coating the exteriors of hollow fiber semi-permeable membranes for fluid separations in which the hollow fiber membranes are assembled in the form of a bundle during coating.

By this invention, processes are provided for coating the exteriors of a plurality of hollow fibers which are suitable for fluid separations and which are assembled in the form of a bundle. Advantageously, the hollow fibers can be arranged in substantially the same orientation and inter-fiber proximity as desired for bundles for installation in modules for fluid separations. Hence little, if any, physical handling of the hollow fibers or bundles is required after the coating operation, which handling might be deleterious to the hollow fibers or the coatings. If desired, the hollow fibers can be coated after installation of the bundle in a module for fluid separations. The coating processes of this invention enable desired coatings to be applied to hollow fibers throughout the bundle without providing undesirably thick coatings on the hollow fibers in any portion of the bundle or on a portion of any of the hollow fibers. Moreover, these coating procedures can enable the exterior of the hollow fibers to be coated without undue sticking between the individual hollow fibers of the bundle, which sticking can reduce the effective area for separation and hinder the flow of fluid through the bundles. Although the processes of this invention can efficiently coat hollow fibers to provide desirable semi-permeable membranes for fluid separations, they still can be relatively non-complex and thus highly advantageous on a production basis.

Hollow fiber semi-permeable membranes have been found to be particularly attractive for fluid separations due to the relatively high structural strength provided by the hollow fiber configuration as compared to that of film membranes and due to the relatively high surface area suitable for effecting the desired separation which can be achieved per unit volume of fluid separation apparatus. Often, in order to obtain adequate selective separation with desirable flux, a hollow fiber semi-permeable membrane comprises a porous support which doe not unduly hinder the flow of the fluid and a coating on the porous support which coating provides the desired selective separation. More recently, Henis et al, disclosed in U.S. Pat. applications Ser. Nos. 742,159, filed Nov. 15, 1976, now abandoned, and 832,481, filed Sept. 13, 1977, both of which are herein incorporated by reference, multicomponent membranes for gas separations comprising a coating in occluding contact with a porous support in which the material of the porous support significantly effects the desired selective separation. Regardless of whether or not the material of the coating effects the desired separation, generally in order to provide desirable selectivity of separation and/or desirable flux it is highly preferred that the coating be applied to the entire surface of the hollow fiber porous support, that the coating be thin, and that the coating not have areas of undue thickness. Unlike many coating applications in which the coating serves aesthetic purposes or provides a relatively impermeable, protective barrier, the thickness and distribution of the coating can effect the performance of a semi-permeable membrane, and if improperly applied, the coating can render the semi-permeable membrane undesirable from the standpoints of selectivity of separation and/or reflux.

Heretofore various procedures have been suggested to coat hollow fibers. These procedures have included, for instance, brushing or spraying material for the coating on hollow fibers, and the immersion of hollow fibers into a liquid bath of the material for the coating. Several problems exist with respect to these procedures. For example, brushing and spraying coating operations essentially require separate treatment for each individual hollow fiber in order that substantially the surface of each hollow fiber is coated. In order to individually coat the fibers, considerable processing time and equipment may be required. Even with such individual treatment, the coating may be substantially thicker at certain portions of hollow fiber than at other portions of the hollow fiber due, e.g., to the force of gravity causing a flowing of the material of the coating after it has been applied. Moreover, the coating may be tacky immediately after being applied such that a drying step is necessary prior to assembling the hollow fibers into a desired bundle configuration so that the hollow fibers do not stick together. Furthermore, the physical handling of the coated hollow fibers in assembling the bundles may be deleterious to the hollow fibers and/or the coatings on the hollow fiber.

The coating of hollow fibers by the immersion of hollow fibers in a liquid comprising the material of the coating may facilitate coating hollow fibers in a bundle arrangement. The mere selection of this coating procedure may not obviate the other difficulties which are often encountered when the material of the coating is applied by brushing or spraying such as the unevenness of the coating, the sticking of hollow fibers having the coating applied to their exteriors, and the necessity of handling the hollow fiber subsequent to the coating operation in order to assemble bundles suitable for use in modules for fluid separations. Moreover, additional problems may be realized when the coating of the hollow fibers, especially arranged in the form of a bundle, is by immersion of the hollow fibers into a liquid comprising material of the coating. For instance, air pockets may occur on the hollow fibers resulting in an incomplete coating and thus repeated coating operations may be required to provide a coating over substantially the entire surface areas of the hollow fibers. These repeated coating operations may result in substantial areas of undesirably thick deposits which can not only reduce the flux of the hollow fibers, but also the thicker coatings may aggravate any sticking problems caused by the coating. Furthermore, the risks of damage to the coating and unevenness of the coating, especially when applied by such immersion procedures, are often increased with the increased length of the hollow fiber. Consequently, the coating of longer hollow fibers which may otherwise be desirable from a manufacturing or fluid separation process standpoint may not be feasible due to difficulties in providing suitable, coated hollow fibers.

Several techniques for coating hollow fiber porous supports are disclosed by Cabasso, et al, in *Research and Development of NS-1 and Related Polysulfone Hollow Fibers for Reverse Osmosis Desalination of Seawater*, Gulf South Research Institute, July 1975, distributed by National Technical Information Service, U.S. Dept. of Commerce, Publication PB 248,666. Cabasso et al, were interested in making a semi-permeable membrane suitable for the desalination of seawater having a polysulfone hollow fiber porous support and a polyethylenimine-isocyanate coating to effect the desalination. One of the major concerns of Cabasso et al, was to determine procedures for coating the exterior of the polysulfone hollow fiber to provide an acceptable, semi-permeable membrane. One coating procedure disclosed by Cabasso et al, was to roll lengths of hollow fibers on a 40 inch by 40 inch frame and then dip the frame in an aqueous bath of polyethylenimine for a period of time, then remove the frame from the bath and allow the aqueous solution to drain, e.g., for about one minute. The drained frame was then dipped in a toluene diisocyanate-hexane solution, removed, air-dried, and subjected to elevated temperatures to cure the coating. The authors reported that this procedure had several difficulties, and the semi-permeable membranes did not perform as well as membranes prepared using other coating procedures. Moreover, the coating was found to be sensitive to any mechanical force such as bending the fiber.

In an attempt to minimize subjecting the hollow fibers after coating to mechanical forces, Cabasso et al, attempted to coat the polysulfone hollow fiber after the fibers were assembled in a bundle having, in some instances, an axially-positioned glass stick for support. Cabasso, et al, not at page 88 that difficulties encountered included the fibers in the unsupported bundles being too close to each other and the fibers tended to stick together in the curing step, the coatings were not uniform, and much of the available space in the supported bundles was sacrificed to provide the glass stick support. Cabasso et al, stated that they therefore abandoned attempting to coat hollow fibers which have been assembled in a bundle.

In view of these substantial problems, Cabasso et al, eventually adopted a procedure in which the polysulfone was continuously coated by drawing the hollow fiber sequentially through an isopropanol solution of furfuryl alcohol and then a sulfuric acid solution, followed by recoating the hollow fiber using the same procedure. This method was not without problems in that the hollow fibers still had to be handled to fabricate a desalination apparatus and the coating procedure may result in uneven deposits. Hence, special techniques had to be employed by Cabasso et al, to avoid the formation of droplets on the furfuryl alcohol-containing solution on the surface of the hollow fiber when it is removed from the furfuryl alcohol-containing solution.

Miszenti et al, disclose in U.S. Pat. No. 3,874,899 the preparation of a semi-permeable membrane suitable for gas separations wherein, in a portion of the disclosed preparation procedure, a microporous layer of alumina is deposited on the inside of a sintered porous alumina tube by passing an aqueous suspension of the alumina through the inside of the tube and filtering the suspension through the walls of the tube. Rembaum discloses in U.S. Pat. No. 4,014,798 the preparation of a porous hollow fiber which is impregnated with polymer having quaternary amine sites. Rembaum states at column 6, lines 47 to 54, that his preferred procedure for impregnating the porous hollow film comprises passing a mixture of polymerizable monomers into one end of the fiber and through the fiber. It is stated that the mixture will also exude through the pores in the walls. After the particles of polymer have been formed in the pores, the excess particles blocking the central passage are removed by forcing liquid through the bore of the fiber.

McCormack in U.S. Pat. No. 3,246,764 discloses semi-permeable membranes for fluid separations which consist of a polymer coating on a porous, hollow filament glass support. McCormack discloses several methods for coating the glass filaments such as by continuously coating the filaments by applying a very dilute solution of the polymer to a bundle of filaments as prepared for use, or by forming the polymer at the external interface of the porous glass by a suitable polymerization or precipitation process. The coating of the exterior of filament arranged in a bundle by applying the materials for coating to the bundle in the manner disclosed by McCormack may present difficulties such as obtaining a suitable influx of the materials into the inner portions of the bundle, obviating the presence of breaches in the coating due to air pockets or the like within the bundle and avoiding unduly thick deposits on the filaments of the outer portions of the bundle. Moreover, the procedure for coating bundles of filaments disclosed by McCormack is apparently similar to the procedure employed by Cabasso et al, for coating polysulfone hollow fibers and was abandoned by Cabasso, et al, due to the problems that they encountered.

Ewing in U.S. Pat. No. 2,730,462 discloses a process for the impregnation of fibrous conduits with, e.g., a coal tar pitch by immersing a fibrous conduit into a hot bath of the coal tar pitch wherein both ends of the conduit are plugged and the interior of the fibrous conduit is in communication through one end plug with a vacuum source, evacuating the conduit, admitting pitch into the evacuated conduit through the other end plug, removing both end plugs, and continuing the immersion until the wall of the conduit has been impregnated to a desired degree of saturation. The impregnation process serves to provide a column of coal tar pitch in the interior of the conduit to provide structural strength during the impregnation since the fibrous conduits rapidly lose their strength when contacted by the hot coal tar pitch.

In accordance with this invention there are provided processes for coating the exteriors of a plurality of hollow fiber porous supports to provide semi-permeable membranes suitable for fluid separations wherein the plurality of hollow fibers is arranged in a bundle. These processes involve immersing the bundle of hollow fibers in a coating liquid containing material suitable for forming the coating (hereinafter depositable material) and providing a sufficient pressure drop from the exterior to the interior (or bore) of the hollow fiber to result in the depositable material being deposited on the exterior of the hollow fiber. Frequently, the depositable material enters the pores, i.e., continuous fluid flow channels extending from the exterior to the bore of the hollow fiber. Thus, the coating on the exterior surface of the hollow fibers can include coatings which enter pores communicating with the exterior surface. The coating liquid contains a substantial amount of solvent for the depositable material such that depositable material which has been deposited on the hollow fiber may be redissolved or suspended in the solvent. The bundle of hollow fibers is desirably maintained in contact with the coating liquid for a time sufficient to provide the desired deposition of the depositable material on the hollow fibers in the bundle. The process of this invention can quickly and efficiently provide the desired deposits on the hollow fibers and thereby are highly desirable.

It has been found that the processes of this invention may be suitable for applying a depositable material to form a deposit which does not result in the undue sticking between the individual hollow fibers in the bundle even though the depositable material may be selected from materials which can provide a tacky deposit when applied only by immersion in a solution of the material. The processes of this invention enable depositable material to be provided over essentially the entire surface areas of the hollow fibers, and any air pockets which might form within the bundle can be dissipated by permeation through the hollow fibers due to the pressure drop across the hollow fibers. Moreover, coatings applied by the processes of this invention generally are substantially free from regions of unduly large thicknesses which can result from, e.g., the flowing of the deposit on a hollow fiber after being applied. Importantly the process of this invention provide desirable deposits on the hollow fibers at the interior portions of the bundle while avoiding the provision of unduly thick deposits on the hollow fibers at the exterior portions of the bundle. Thus, processes of this invention can provide acceptable, semi-permeable membranes in that the deposits can be sufficiently thin to not unduly reduce the flux of the membrane; that the deposits can be provided over essentially the entire surface area of the hollow fibers; that the deposits can be sufficiently uniform throughout the bundle such that not only the hollow fibers at the interior portions of the bundle have desirable selective separation properties which are enabled by the presence of the deposit, but also the deposits on the hollow fibers at the exterior portions of the bundle are not unduly thick so as to significantly reduce their effectiveness for fluid separations; and that there is not an undue amount of fibers sticking together, which sticking reduces not only the effective surface membrane area available for fluid separations, but also the ability of fluids to be distributed throughout the bundle.

Since the processes of this invention enable hollow fiber, semi-permeable membranes to be coated while in a bundle arrangement, significant advantages are provided. For instance, the bundle may be adapted for insertion in a module for fluid separations, and the hollow fibers may be coated and subsequently secured in the module with minimal handling of the bundle and hollow fibers and thereby avoid undue damage to the coating which is often highly susceptible to physical damage when subjected to mechanical forces. In a particularly advantageous aspect of the invention, bundles of hollow fibers can be installed in a retaining vessel, and then the hollow fibers can be coated in accordance with a process of this invention while in the retaining vessel. The retaining vessel may be any suitable vessel which is impervious to the coating liquid. In one aspect of this invention, the retaining vessel is a container suitable for shipping the bundle of hollow fibers, and may even be the module for fluid separations. Hence, the hollow fibers need not be handled outside the module after the coating. Alternatively, the container may provide sufficient protection to the bundle for shipping and may be a unit adapted for insertion in a module suitable for fluid separations, or the container may be adapted for facile removal of the bundle when it is desired to install the bundle in a module.

In further detail, the depositable material, i.e., a material suitable for forming the coating, desirably has a sufficiently large molecular size (if dissolved in the solvent) or a sufficiently large particle size (if suspended in the solvent, say, as a colloidal suspension) that the depositable material does not readily pass through the pores in the walls of the hollow fibers when subjected to pressure drops suitable for processes in accordance with this invention. Thus, with follow fibers having pores of generally larger diameters, depositable materials which have larger sizes when in the coating liquid are frequently desired. In some instances it is desirable to employ depositable materials which, when in the liquid substance, have sufficiently small sizes that they can enter, instead of bridge, pores in the hollow fiber. The use of such materials having small sizes is particularly advantageous in the preparation of multicomponent membranes in which the material of the hollow fiber substantially effects the fluid separation. The depositable material may directly form the coating when deposited, or the deposit of the depositable material may be further treated, e.g., by cross-linking, to form the desired coating.

The coating liquid comprises a solvent (or vehicle) for the depositable material. The slvent should be capable of dissolving the depositable material or be capable of enabling a finely-divided suspension of the depositable material, say, having particle diameters less than about 1 micron, e.g., less than about 5000 angstroms (i.e., colloidal size), to be provided. Desirably, the coating liquid contains substantial amounts of solvent, e.g., a major amount of solvent, such that during deposition of the depositable material on the hollow fiber, depositable material, which is not forcibly retained on the hollow fiber due to adhesion to the material of the hollow fiber and/or due to the presence of the pressure drop in accordance with processes of this invention, can be redissolved or otherwise removed from the vicinity of the hollow fiber. Also, the coating liquid contains sufficient amounts of solvent such that the coating liquid exhibits a viscosity at temperatures employed in the coating processes which viscosity is advantageously low to enable relatively rapid, adequate permeation of the coating liquid through the bundle. Often, the viscosity of the coating liquid at such temperatures is less than about 25 or 50, and in some instances less than about 10, centipoise, say, about 0.1 to 5 centipoise. Often, the depositable material comprises less than about 20, preferably, less than about 15, say, about 0.1 to 15, weight percent of the coating liquid. Most frequently, the depositable material comprises 0.5 to 10, weight percent of the coating liquid.

The contact of the coating liquid containing the depositable material with the bundle of hollow fibers in order to effect the desired deposition is advantageously provided by immersion of the bundle in the coating liquid. While the bundle may be partially immersed to provide a deposit on essentially only that portion of the surface area available for fluid separations (i.e., effective surface area) of the hollow fibers which is submerged, generally at least the entire effective surface areas of the hollow fibers is submerged in the coating liquid. The immersion of the hollow fibers in the coating liquid may be effected in any suitable manner. For instance, the bundle may be dipped into the coating liquid. However, it is generally preferred that the coating liquid be added to a retaining vessel containing the bundle such that any undesirable physical stresses on the hollow fibers, which stresses may be encountered in dipping the bundle in the coating liquid can be avoided. Moreover, this method for providing the desired immersion is particularly suited to a preferred aspect of this invention wherein the bundle of hollow fibers is installed in a container suitable for shipping the bundle and then coated. The coating liquid may be unagitated or may preferably be agitated, e.g., by circulating the coating liquid through the retaining vessel to assist in maintaining the suspension of the depositable material (if the depositable material is in particulate form in the coating liquid) and in providing desirable distribution of the coating liquid through the bundle.

The coating liquid in the bundle may be at any suitable temperature immediately before and during the immersion which is not deleterious to the coating liquid or the hollow fibers. The temperature should be sufficiently high to provide the coating liquid with a desirable viscosity for conducting coating processes in accordance with this invention, but not unduly elevated such that either the coating liquid, particularly the depositable material, or the hollow fibers are adversely affected. The temperatures of the coating liquid and bundle immediately before and during the immersion are below the boiling point of the coating liquid under the conditions of coating operation, and frequently are within the range of about $-10°$ to $70°$ C., say, about $0°$ to $50°$, and most conveniently, about ambient temperature, e.g., about $5°$ to $40°$ C.

The hollow fibers are subjected to a pressure drop from the exterior to the interior of the fibers at least while immersed in the coating liquid. If expedient, the hollow fibers may be subjected to the pressure drop prior to the immersion of the bundle in the coating liquid; however, the bundle can be immersed in the coating liquid and then the pressure drop can be provided. The pressure drop is desirably maintained for a time (either intermittent or preferably continuous) sufficient to provide the desired deposit on the hollow fibers. The pressure drop from the exterior to the interior of the hollow fiber during the immersion is sufficient to provide the desired deposit of depositable material on the exterior of the hollow fiber. Generally, the pressure drop is at least about 5 pounds per square inch, say, about 5 to 100 or more, pounds per square inch. Although higher pressure drops can be employed, such high pressure drops are not frequently employed due to economic and safety considerations. Often, little, if any, benefit is obtained by increasing the pressure drops to greater than about 50 pounds per square inch. Preferably, the pressure drop is about 10 to 50 pounds per square inch. It may be desired to maintain the bore side of the hollow fibers at subatmospheric pressure, e.g., less than about 200, often less than about 50, millimeters of mercury absolute pressure. At these low pressures, solvent passing through the membrane may be pervaporized. The pressure drop is often maintained for a duration of at least about 0.01 hour, e.g., about 0.05 to 10 or 50 hours, say, about 0.05 to 5 hours. Since the deposit on the hollow fiber is subject to being dissolved or otherwise removed from the hollow fiber due to the presence of the solvent, a pressure drop from the exterior to the interior of the hollow fibers may be maintained when the bundle is emersed from the coating liquid. However, maintaining the pressure drop when the bundle is emersed from the coating liquid has generally not been found essential to provide the benefits of the processes of this invention.

The bundle is immersed in the coating liquid for a sufficient duration to provide the desired deposition of the depositable material. Generally, the duration of immersion depends on the size (particularly the diameter) of the bundle, the packing factor of the hollow fibers in the bundle, the viscosity of the coating liquid, and the pressure drop across the walls of the hollows fibers. In many instances, the duration of the immersion will be at least about 0.01 hour and may be up to about 50 or more hours, e.g., about 0.05 to 10 hours, say, about 0.05 to 5 hours. The emersion of the bundle may be by removing the bundle from the coating liquid or by draining the coating liquid from the retaining vessel.

After the emersion of the bundle from the coating liquid, the bundle may be immersed in at least one additional coating liquid, which additional coating liquid may or may not be essentially the same as that of the first coating liquid, in order to provide two or more coatings on the hollow fibers or to chemically affect at least one preceding deposit, e.g., by cross-linking or the like. Cross-linking or other procedures which chemically affect the deposit may be provided by contact with a suitable liquid or gaseous agent. The deposits on the hollow fibers may or may not be dried (i.e., the remaining solvent removed) or otherwise treated intermediate the immersions.

Frequently, after the emersion of the bundle from the coating liquid, the deposit is dried, i.e., the remaining solvent is removed. The drying can be conducted in any suitable manner. For instance, the bundle may be air dried or gases which are unsaturated with the solvent may be passed through the bundle. Preferably, in instances in which the solvent poses a fire risk, the drying gases are substantially inert such as nitrogen, carbon dioxide, etc. Conveniently, in the aspect of this invention in which the hollow fibers are coated after the bundle is installed in a retaining vessel, drying gases are passed through the retaining vessel on the exterior side of the hollow fibers. The temperature of the drying gases may vary substantially, for instance, from about $-10°$ to $100°$ or $150°$ C. or more, provided that the desired drying occurs and the material deposited and the hollow fibers are not unduly adversely affected. For the sake of convenience, the drying gases may be at slightly elevated temperatures, e.g., about $30°$ to $70°$ C. The drying is generally conducted for a time sufficient to remove substantially all of the solvent from the exteriors of the hollow fibers, e.g., often about 1 to 48 hours. After drying, the deposit on the exterior surfaces of the hollow fibers throughout the bundle is sufficiently non-tacky that no undue sticking of the hollow fibers occurs.

The depositable material which is deposited on the hollow fibers may not directly form the desired coating but rather may be a precursor for the coating. Thus, the depositable material may be capable of reacting with one or more simultaneously or subsequently provided components, or it may be capable of homopolymerizing, to provide the desired coating. Therefore, in accordance with an aspect of this invention, conditions are provided during the drying and/or subsequent to the drying to chemically convert the depositable material on the hollow fibers to the desired material of the coating. Hence, by processes of this invention coatings can be provided that are comprised of materials which materials would not be desirable as depositable materials.

The resulting coating (or coatings) on the hollow fibers are relatively uniform over the length of the hollow fibers and throughout the bundle. Generally, the coating has an average thickness of up to about 50 microns, say, about 0.0001 to 50 microns. Frequently, the average thickness of the coating is less than about 1, and may even be less than about 0.5, micron. Advantageously, the coating is substantially permanent on the hollow fiber and thus does not unduly separate from the hollow fiber during storage or use of the hollow fiber membrane in fluid separation operations. The processes of this invention may, at least in some instances, assist in providing the substantially permanent nature of the coatings.

The hollow fibers which are coated by processes in accordance with this invention are porous, i.e., have continuous channels for fluid flow extending between the exterior and interior surfaces. Frequently, the pores have an average cross-sectional diameter less than about 20,000, and in some hollow fibers the cross-sectional diameter is less than about 1000 or 5000, angstroms. Particularly advantageous hollow fibers, especially for gas separations wherein the material of the hollow fiber effects a significant portion of the separation, such as disclosed by Henis et al, in the above-recited patent applications, the average pore cross-sectional diameter is about 5 to 200 angstroms. Often the ratio of total surface area to total pore cross-sectional area of the hollow fiber is at least about 10:1. For membranes for gas separations, especially in those membranes in which a significant portion of the separation is effected by the material of the hollow fiber, the ratio of total surface area to total pore cross-sectional area of the hollow fiber is at least about $10^3:1$, and some hollow fibers may have ratios of about $10^3:1$ to $10^8:1$ or $10^{12}:1$.

Advantageously, the walls of the hollow fibers are sufficiently thick that no special apparatus is required for their handling. Frequently, the hollow fibers may have outside diameters of about 20 to 1000 microns, say, about 50 to 1000, e.g., about 250 to 1000 microns, and have walls of at least about 5 microns in thickness. The wall thickness in some hollow fibers may be up to about 200 or 300 microns. In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, say, about 10 to 80, and sometimes about 20 or 30 to 70, percent based on the superficial volume, i.e., the volume contained within the gross dimensions, of the hollow fiber. The density of the hollow fiber can be essentially the same throughout its thickness, i.e., isotropic, or the hollow fiber can be characterized by having at least one relatively dense region within its thickness in barrier relationship to fluid flow through the wall of the hollow fiber, i.e., the hollow fiber is anisotropic. Generally, a relatively dense region of anisotropic hollow fibers is substantially at the exterior of the hollow fiber, and, preferably, the coating contacts this relatively dense region.

The material used for the hollow fiber may be a solid natural or synthetic substance. The selection of the material for the hollow fiber may be based on the heat resistance, solvent resistance, and/or mechanical strength of the hollow fiber, as well as other factors dictated by the intended separation process in which it will be used and the operating conditions to which it will be subjected. Thus, for instance, the selection of the material of the hollow fiber may be based on whether or not the material of hollow fiber is intended to significantly effect the fluid separation, in which event the material of the hollow fiber has useful separation properties, or whether the coating is intended to effect the fluid separation. The hollow fibers may be flexible or substantially rigid. Since flexible hollow fibers may easily bend to contact each other, and thus make coating more difficult, the coating methods of this invention are particularly advantageous for coating bundles of flexible hollow fibers. The material used for the hollow fibers may be inorganic to provide, e.g., hollow glass, ceramic, cermet, sintered metal, or the like, fibers. In the case of polymers, both addition and condensation polymers which can be fabricated in any suitable manner to provide porous hollow fibers are included. Generally organic or organic polymers mixed with inorganics (e.g., fillers) are used to prepare the hollow fibers. Typical polymers can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate; cellulose-acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramide-diisocyanate); polyurethanes; polyesters (including polyarylates), such as poly(ethylene terephthalate), poly (alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyfinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block terpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as flurorine, chlorine and bromine; hydroxyl groups; lower alkyl groups; lower alkoxy groups; monocyclic aryl; lower acyl groups and the like.

The depositable material should be capable of providing desirable contact with the hollow fiber. For instance, when applied it should sufficiently wet and adhere to the hollow fiber to enable the contact to occur. The wetting properties of the depositable material can be easily determined by contacting the depositable material, either alone or in a solvent, with the material of the hollow fiber. Moreover, based on estimates of the average pore diameter of the hollow fiber, depositable materials of appropriate molecular size can be chosen. If the molecular size of the depositable material is too small, it may be drawn through the pores of the hollow fiber during coating and/or fluid separation operations. If, on the other hand, the molecular size of the depositable material is too large to be accommodated by the pores of the hollow fiber, the depositable material may not provide desirable contact for some multicomponent membranes. Thus with hollow fibers having larger pores, it may be desirable to employ depositable materials having larger molecular sizes than with smaller pores. When the pores are in a wide variety of sizes, it may be desirable to employ a polymerizable material for the depositable material which is polymerized after application to the hollow fiber, or to employ two or more depositable materials of different molecular sizes, e.g., by applying the depositable materials in order of their increasing molecular sizes.

The depositable materials may be natural or synthetic substances which are organic or inorgaic or mixtures thereof and advantageously exhibit the appropriate properties to provide desirable contact with the hollow fiber. Inorganic coatings can comprise metals, elemental carbon, ceramics including metal oxides, glasses, etc. Organic synthetic substances include both addition and condensation polymers. Typical of the useful materials which can comprise the depositable material are polymers which can be substituted or unsubstituted. The materials include synthetic rubbers; natural rubbers; relatively high molecular weight and/or high boiling liquids; organic prepolymers; poly(siloxanes) (silicone polymers); polysilazanes; polyurethanes poly(epichlorhydrin); polyamines; polyimines; polyamides; a crylonitrile-containing copolymers such as poly($\alpha$-chloroacrylonitrile) copolymers; polyesters (including polylactams and polyarylates), e.g., poly(alkyl crylates) and poly(alkyl methacrylates) wherein the alkyl groups have, say, 1 to about 8 carbons, polysebacates, polysuccinates, and alkyd resins; terpinoid resins such as linseed oil; cellulosic polymers; polysulfones, especially aliphatic-containing polysulfones; poly(alkylene glycols) such as poly(ethylene glycol), poly(propylene glycol), etc.; poly(alkylene) polysulfates; polypyrrolidones; polymers from monomers having $\alpha$-olefinic unsaturation such as poly(olefins), e.g., poly(ethylene), poly(propylene), poly(butadiene), poly(2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly(methylvinylketone)), poly(vinyl esters) (e.g., poly(vinyl benzoate)), poly(vinyl halides) (e.g., poly(vinyl bromide)), poly(vinylidene halides), poly(vinylidene carbonate), poly(N-vinylmaleimide), etc.; poly(1,5-cyclooctadiene); poly(methylisopropenylketone); fluorinated ethylene copolymers; poly(arylene oxides), e.g., poly(xylylene oxide); polycarbonates; polyphosphates, e.g., poly(ethylenemethylphosphate); and the like, and any interpolymers including block interpolymers containing repeating units from the above, and grafts and blends containing any of the foregoing, and monomers of the above-mentioned polymers.

Particularly useful depositable materials comprise poly(siloxanes). Typical poly(siloxanes) can comprise aliphatic or aromatic moieties and often have repeating units containing 1 to about 20 carbon atoms. The molecular weight of the poly(siloxanes) may vary widely, but is generally at least about 1000. Often, the poly(siloxanes) have a molecular weight of about 1,000 to 300,000 when applied to the hollow fiber membrane. Common aliphatic and aromatic poly(siloxanes) include the poly(monosubstituted and disubstituted siloxanes), e.g., wherein the substituents are lower aliphatic, for instance, lower alkyl, including cycloalkyl, especially methyl, ethyl, and propyl, lower alkoxy, aryl including mono or bicyclic aryl including phenylene, naphthalene, etc.; lower mono and bicyclic aryloxy; acyl including lower aliphatic and lower aromatic acyl; and the like. The aliphatic and aromatic substituents may be substituted, e.g., with halogens, e.g., fluorine, chlorine and bromine, hydroxyl groups, lower alkyl groups, lower alkoxy groups, lower acyl groups and the like. Some poly(siloxanes) do not sufficiently wet a hollow fiber, e.g., a polysulfone hollow fiber, to provide as much desired contact as is desired. However, dissolving or dispersing the poly(siloxane) in a solvent for the poly (siloxane) which does not substantially affect the polysulfone can facilitate obtaining occluding contact. Suitable solvents include normally liquid alkanes, e.g., pentane, cyclohexane, etc.; aliphatic alcohols, e.g., methanol; some halogenated alkanes and halogenated dialkyl ethers; and dialkyl ethers; and the like; and mixtures thereof.

If the depositable material is a monomer, prepolymer or curable polymer, the depositable material may be polymerized after deposition on the hollow fiber. The polymerization may be conducted by contacting the deposit with a polymerization agent such as a comonomer, catalyst or the like. For instance, if the depositable material is furfuryl alcohol, it may be contacted with sulfuric acid to promote the desired polymerization. Poly(siloxanes) may be cross-linked in the presence of a cross-linking agent to provide a silicone rubber, and the poly(siloxane) may be a copolymer with a cross-linkable comonomer such as $\alpha$-methylstyrene to assist in the cross-linking. Typical catalysts to promote cross-linking include the organic and inorganic peroxides. Frequently, the poly(siloxanes) has a molecular weight of about 1,000 to 100,000 prior to cross-linking. Particularly advantageous poly(siloxanes) which are cured after being deposted on the hollow fiber include copolymer of $\alpha$-methylstyrene and dimethylsiloxane and postcured poly(dimethylsiloxane)-containing silicone rubber having a molecular weight of about 1,000 to 50,000 prior to cross-linking.

The solvent employed in the processes of this invention should be capable of dissolving the depositable material or maintaining finely-divided particles of the depositable material in suspension during the coating operation of (e.g., as a colloidal suspension or in a latex-like suspension). Often, when the depositable material is dissolved, the solvent serves to reduce the surface tension of the depositable material such that unduly thick residues of the depositable material are not provided on the hollow fibers. Desirably, the solvent does not significantly adversely affect the material of the hollow fiber. The solvent may be of sufficiently small molecular size that it can pass through the pores of the hollow fiber; however, satisfactory coatings have been obtained using solvents of such molecular sizes that little solent passed through the pores. Advantageously, the solvent has a relatively high vapor pressure such that residual solvent can readily be removed from the depositable material on the hollow fiber without unduly adversely affecting the depositable material or the hollow fiber. Typical solvents which may find application in process of this invention include normally liquid organic solvents such as alkanes, e.g., pentane, isopentane, cyclohexane, etc.; aliphatic alcohols, e.g., methanol, isopropanol, cyclohexanol, etc., halogenated alkanes and halogenated dialkyl ethers; dialkyl ethers; water; and the like, and mixtures thereof. Advantageously, the solvent and depositable material are thoroughly admixed prior to immersion of the bundle.

The bundle may be in any suitable configuration and dimension, and have any suitable packing factor of hollow fibers, for its intended use in fluid separations. Generally, the hollow fibers are oriented in substantially the same direction. The fibers may be straight or curved and may be generally parallel, helically wound, or the like. The bundles often have a minimum cross-sectional diameter, say, of about 0.02 to 1 meter, e.g., at least about 0.05, say, about 0.05 to 0.5 meter. The effective length of the hollow fibers in the bundle may also vary widely, for instance, from about 0.2 to 15 or 20 meters, e.g., about 1 to 10 meters. The theoretical maximum packing factor for cylinders of the same diameter, i.e., the percent of a total given area which is filled by the cross-sectional areas of the cylinders, in about 91 percent. Generally, the packing factors for bundles employed in modules for fluid separations having a packing factor of at least about 35 or 40, up to about 55 or 60, often about 45 to 55, percent. The total effective surface area of the bundle is thus dependent upon the configuration and dimension of the bundle, the size of the hollow fiber, and the packing factor of the hollow fibers in the bundle.

The bundle may be encased (or potted) proximate at least one end to form a seal such that the bundle can be installed in a module with no direct fluid communication between the exterior and interior of the hollow fibers except through the walls of the hollow fibers. The potting of the hollow fibers is preferably conducted prior to the coating operation to facilitate maintaining the desired pressure drop from the exterior to the interior of the fibers.

The following examples are provided to further illustrate the invention but are not intended to be in limitation of the invention. All parts and percentages of liquids and solids are by weight and all parts and percentages of gases are by volume unless otherwise indicated.

EXAMPLE I

A bundle containing approximately 1200 polysulfone hollow fibers is prepared. The hollow fibers are each about 30 centimeters in length and about 600 microns in diameter with a wall thickness of about 1500 microns. The hollow fiber is prepared from dried polysulfone polymer having the repeating unit

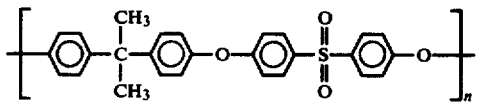

where n, representing the degree of polymerization, is about 50 to 80 and is available from Union Carbide under the designation P-3500. The polysulfone is admixed with dimethylacetamide to provide a dope containing about 27.5 weight percent polymer, and the dope is coagulation spun into water at a temperature of about 40° C. through a spinnerette which is immersed in the water. The spinnerette has an outer orifice diameter of 0.0559 centimeters, an inner pin of 0.0229 centimeters, and an injection port of 0.0127 centimeters through which water is provided. The dope is pumped and metered to the spinnerette at a rate of about 7.2 milliliters per minute and is drawn from the spinnerette as a hollow fiber at a rate of about 33 meters per minute. After the coagulation has substantially occurred, the hollow fiber is washed in room temperature water, stored in an aqueous vat at room temperature, then dried under ambient conditions.

The fibers are formed into a cylindrical bundle about 2.5 centimeters in diameter (about a 50 percent packing factor). Epoxy seals are fabricated on each end of the bundle by sealing the ends of the fibers at both ends of the bundle then immersing the ends (tube sheet and plug ends) in liquid epoxy resin and allowing the epoxy resin to cure. After curing, a knife is used to open the bores of the hollow fibers at the tube sheet end, and the plug ends of the hollow filaments are maintained closed.

The thusly formed bundle is placed in a polycarbonate tube with the tube sheet end outside the tube. A solution of 5 percent Slygard 184 in isopentane is placed in the tube to cover the bundle. Slygard 184 is a cross-linkable dimethylsiloxane polymer which is available from Dow Corning and cures at ambient temperatures. The bores of the fibers are in communication with a vacuum of about 600 to 700 millimeters of mercury. The immersion is for about 15 minutes, and the vacuum is continued for about another 15 minutes upon emersion of the bundle from the solution. The coated bundle is cured in an oven at about 40° C. for 24 hours. This procedure is repeated to prepare a second bundle.

The hollow fibers appear to have coatings less than about 0.2 micron in thickness, and the hollow fibers are not unduly stuck together. The bundles are tested to determine permeabilities to varius gases and anticipated performances in gas separation operations. The tests are made utilizing dry air and pure hydrogen and pure carbon monoxide. The shell-side pressure is 50 pounds per square inch gauge, and the bore is at ambient pressure. The effective surface area of the first bundle is estimated to be about 5860 square centimeters and exhibits an oxygen flux of about $6.5 \times 10^{-6}$ cubic centimeters (STP) per square centimeter per second per centimeter of mercury pressure drop ($cm^3/cm^2$-sec-cmHg) and a hydrogen flux of about $60 \times 10^{-6}$ $cm^3/cm^2$-sec-cmHg. The separation factor of oxygen over nitrogen (i.e., the ratio of the fluxes of the gases) is determined to be about 5.3, and the separation factor of hydrogen over carbon monoxide is determined to be 36. For the second bundle, the effective surface area is estimated to be about 5985 square centimeters, and the oxygen and hydrogen fluxes are determined to be about 6.7 and 58, $cm^3/cm^2$-sec-cmHg, respectively. The separation factor of oxygen over nitrogen is determined to be about 4.2, and the separation factor for hydrogen over carbon monoxide is determined to be about 33.

EXAMPLE II

The procedure of Example I is essentially repeated to provide a bundle having an effective surface area of approximately 6000 to 6500 square centimeters. The bundle is employed for the separation of hydrogen from a stream at pressure of about 270 pounds per square inch gauge containing about 25 mole percent carbon monoxide and 75 mole percent hydrogen. The pressure drop across the walls of the fibers is varied during the separation from about 130 to 200 pounds per square inch. The hydrogen flux is determined to be about 53 to $58 \times 10^{-6}$ $cm^3/cm^2$-sec-cmHg. The stream contacts the shell side of the bundles and approximately 40 to 45 volume percent of the feed is recovered on the shell side with less than about a 1 pound per square inch pressure drop and a carbon monoxide to hydrogen volume ratio of about 1:1 to 1.2:1.

EXAMPLE III

A bundle of the hollow fibers similar to those described in Example I is prepared and has the approximate dimensions of 5 centimeters in diameter and 1200 centimeters in length. The uncoated bundle is installed in a module suitable for fluid separations having an entrance port and an open end on the shell side and an exit port on the bore side of the bundle. The module is oriented vertically such that the open end is at the top. The exit port on the bore side of the bundle is in communication with a laboratory vacuum source providing an absolute pressure of less than about 50 millimeters of mercury. A solution of about five percent Sylgard 184 in isopentane is pumped into the shell side of the module and continuously overflows the open end and is recovered. The Sylgard solution is maintained in the module for about 15 minutes and then drained from the module. The vacuum on the bore side of the bundle is maintained for about an additional 15 minutes while the fibers are dried by passing warm nitrogen (about 40° to 50° C.) over the shell side of the fibers, then warm air (about 40° to 50° C.) is passed over the shell side of the fibers for about 12 hours.

EXAMPLE IV

The procedure of Example III is essentially repeated with the following exceptions. The bundle is about 10 centimeters in diameter and about 3 meters in length. The end of the shell is capped and has a port through which the Sylgard solution can exit and be recycled to the shell side entrance port. The Sylgard solution is maintained in the module for about 30 minutes, and the vacuum on the bore side is terminated. The warm nitrogen (about 50° to 60° C.) is passed through the shell side of the module for about 45 minutes, and the warm air is passed through the shell side of the module for about 18 hours.

EXAMPLE V

The procedure of Example IV is essentially repeated except that the coating liquid comprises about 5 weight percent Sylgard 184 in cyclohexane. The shell side of the module is maintained at about 2.4 atmospheres absolute pressure during coating, and the bore side of the module is maintained at about 1 atmosphere absolute pressure. Only small amounts of cyclohexane are observed to pass to the bore-side of the module.

It is claimed:

1. A process for coating the exteriors of hollow fibers assembled in the form of a bundle, which fibers, when coated, are suitable for fluid separations, comprising immersing the bundle of hollow fibers in a coating liquid containing material suitable for forming the coating and a sufficient amount of solvent to redissolve or resuspend any deposits on the hollow fibers of said material suitable for forming the coating which deposits are not retained on the hollow fibers; subjecting the hollow fibers to a pressure drop from the exterior to interior of the hollow fibers while the bundle is immersed in the coating liquid, said pressure drop being sufficient to provide a deposit of the material suitable for forming the coating on the hollow fibers; and removing the coating liquid from the bundle.

2. The process of claim 1 wherein the bundle has a packing factor of at least about 40 percent and a minimum cross-sectional dimension of at least about 0.05 meter, the coating liquid has a viscosity less than about 25 centipoise at the temperature at which the coating is conducted, and the pressure drop is at least about 5 pound per square inch.

3. The process of claim 2 wherein the immersion is for about 0.05 to 5 hours.

4. The process of claim 2 wherein the coating liquid comprises about 0.1 to 15 weight percent material suitable for forming the coating.

5. The process of claim 4 wherein the temperature of the coating liquid is about −10° to 70° C.

6. The process of claim 5 wherein the material suitable for forming the coating is polymerizable and is polymerized after being applied to the hollow fibers.

7. The process of claim 2 wherein the hollow fibers have an average pore cross-sectional diameter less than about 1000 angstroms and a ratio of total surface area to total pore cross-sectional area of at least about $10^3:1$.

8. The process of claim 7 wherein the hollow fibers are anisotropic with at least one relatively dense region in barrier relationship to fluid flow through the wall of the hollow fiber and have a void volume of about 10 to 80 percent based on the superficial volume of the hollow fiber.

9. The process of claim 8 wherein the material suitable for forming the coating comprises polymer.

10. The process of claim 9 wherein the polymer comprises poly(siloxane).

11. The process of claim 2 wherein the material suitable for forming the coating comprises polymer.

12. The process of claim 11 wherein the coating liquid comprises about 0.1 to about 15 weight percent polymer.

13. The process of claim 12 wherein the immersion is for about 0.05 to 5 hours.

14. The process of claim 13 wherein the temperature of the coating liquid is about −10° to 70° C.

15. The process of claim 14 wherein the hollow fibers are anisotropic with at least one relatively dense region in barrier relationship to fluid flow through the wall of the hollow fiber and have a void volume of about 10 to 80 percent based on the superficial volume of the hollow fibers.

16. The process of claim 15 wherein the bundle is coated in a container suitable for shipping the bundle.

17. The process of claim 2 wherein the bundle is coated in a container suitable for shipping the bundle.

18. The process of claim 2 wherein the hollow fibers have an outside diameter of about 50 to 1000 microns.

19. A process for coating the exteriors of hollow fibers assembled in the form of a bundle having a minimum cross-sectional dimension of at least about 0.05 meters and a packing factor of at least about 40, which fibers, when coated, are suitable for fluid separations, comprising placing the bundle in a retaining vessel; immersing the bundle in the retaining vessel in a coating liquid comprising about 0.1 to 15 weight percent of material suitable for forming the coating in a solvent for said material; subjecting the hollow fibers to a pressure drop of at least about 5 pounds per square inch from the exteriors to the interiors of the hollow fibers while immersed in the coating liquid, said pressure drop being maintained for about 0.05 to 5 hours; and removing the coating liquid from the bundle.

20. The process of claim 19 wherein the interiors of the hollow fibers are at subatmospheric pressures.

21. The process of claim 20 wherein solvent passes through the walls of the hollow fibers.

22. The process of claim 21 wherein the solvent pervaporizes through the walls of the hollow fibers.

23. The process of claim 19 wherein the retaining vessel is a container suitable for shipping the bundle.

24. The process of claim 19 wherein the retaining vessel is a module suitable for conducting fluid separations.

25. The process of claim 19 wherein the thickness of the coating is less than about 0.5 micron.

26. The process of claim 25 wherein the hollow fibers are anisotropic with at least one relatively dense region in barrier relationship to fluid flow through the wall of the hollow fiber and have a void volume of about 10 to 80 percent based on the superficial volume of the hollow fiber.

27. The process of claim 26 wherein the material suitable for forming the coating comprises polymer.

28. The process of claim 27 wherein the polymer comprises poly(siloxane).

29. The process of claim 26 wherein the polymer is further polymerizable and is polymerized after being applied to the hollow fibers.

30. The process of claim 29 wherein the polymer is a poly(siloxane) comprising aliphatic or aromatic moieties having repeating units containing 1 to about 20 carbon atoms, said polysiloxane having a molecular weight of at least about 1000 prior to cross-linking.

31. The process of claim 30 wherein the solvent comprises isopentane and the interiors of the hollow fibers are at subatmospheric pressures.

32. The process of claim 19 wherein the temperature of the coating liquid is about $-10°$ to $70°$ C.

* * * * *

UNITED STATES PATENT AND TRADEMARK OFFICE
CERTIFICATE OF CORRECTION

PATENT NO. : 4,214,020
DATED : July 22, 1980
INVENTOR(S) : R. R. Ward, R. C. Chang, J. C. Danos and J. A. Carden, Jr.

It is certified that error appears in the above-identified patent and that said Letters Patent are hereby corrected as shown below:

Claim 21, line 1, "20" should read -- 32 --.

Signed and Sealed this

Seventh Day of October 1980

[SEAL]

Attest:

SIDNEY A. DIAMOND

Attesting Officer

Commissioner of Patents and Trademarks